US012057792B2

(12) United States Patent
Bykothuru Srinivasa Reddy et al.

(10) Patent No.: US 12,057,792 B2
(45) Date of Patent: Aug. 6, 2024

(54) ENERGY HARVESTING ROLLER ASSEMBLY

(71) Applicant: Goodrich Corporation, Charlotte, NC (US)

(72) Inventors: Saritha Bykothuru Srinivasa Reddy, Bangalore (IN); Thirunavukkarasu Ramalingam, Bangalore (IN); Elangovan Palaniappan, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/335,894

(22) Filed: Jun. 15, 2023

(65) Prior Publication Data
US 2023/0327582 A1 Oct. 12, 2023

Related U.S. Application Data

(62) Division of application No. 16/713,277, filed on Dec. 13, 2019, now Pat. No. 11,750,118.

(30) Foreign Application Priority Data

Oct. 11, 2019 (IN) .............................. 201941041265

(51) Int. Cl.
H02N 2/18 (2006.01)
B65G 39/09 (2006.01)
H02J 7/00 (2006.01)

(52) U.S. Cl.
CPC ............ *H02N 2/186* (2013.01); *B65G 39/09* (2013.01); *H02J 7/0068* (2013.01)

(58) Field of Classification Search
CPC .......... H02N 2/186; H02N 2/18; H02N 2/181; B65G 39/09; H02J 7/0068; H02J 7/00712
USPC ......................................................... 307/19
See application file for complete search history.

(56) References Cited

U.S. PATENT DOCUMENTS

| 7,392,715 | B2 | 7/2008 | Moore et al. |
| 8,387,452 | B2 | 3/2013 | Brusarosco et al. |
| 9,419,546 | B2 | 8/2016 | Trauernicht |
| 2004/0173440 | A1* | 9/2004 | Mauch ................... B65G 43/10 198/781.05 |

(Continued)

FOREIGN PATENT DOCUMENTS

| DE | 102019126209 | 4/2021 |
| WO | 2019040611 | 2/2019 |

OTHER PUBLICATIONS

USPTO; Requirement for Restriction dated Dec. 6, 2023 in U.S. Appl. No. 16/713,277.

(Continued)

Primary Examiner — Rexford N Barnie
Assistant Examiner — Swarna N Chowdhuri
(74) Attorney, Agent, or Firm — SNELL & WILMER L.L.P.

(57) ABSTRACT

An energy harvesting roller for a cargo handling system may comprise a shaft and a sleeve located on the shaft. A piezoelectric member may be coupled to the sleeve. A shell may be located radially outward of the piezoelectric member and configured to rotate relative to the sleeve. A radially inward surface of the shell may define at least one of a plurality of grooves or a plurality of protrusions.

9 Claims, 8 Drawing Sheets

(56) References Cited

U.S. PATENT DOCUMENTS

| | | | |
|---|---|---|---|
| 2009/0320612 A1* | 12/2009 | Moore | G01K 1/026 |
| | | | 73/862.55 |
| 2012/0082501 A1* | 4/2012 | Kostudis | B65H 18/103 |
| | | | 400/611 |
| 2012/0213458 A1* | 8/2012 | Zuiko | F16C 13/022 |
| | | | 384/91 |
| 2013/0206549 A1* | 8/2013 | Clevers | G03G 15/167 |
| | | | 198/807 |
| 2021/0024296 A1 | 1/2021 | Lillington | |
| 2021/0047124 A1* | 2/2021 | Ramezani | B65G 23/22 |

OTHER PUBLICATIONS

USPTO; Non-Final Office Action dated Feb. 18, 2022 in U.S. Appl. No. 16/713,277.
USPTO; Non-Final Office Action dated Sep. 16, 2022 in U.S. Appl. No. 16/713,277.
USPTO; Notice of Allowance dated Mar. 23, 2023 in U.S. Appl. No. 16/713,277.

* cited by examiner

ENERGY HARVESTING ROLLER ASSEMBLY

CROSS REFERENCE TO RELATED APPLICATIONS

This application is a divisional of, and claims priority to and the benefit of, U.S. patent application Ser. No. 16/713,277, filed Dec. 13, 2019, entitled "ENERGY HARVESTING ROLLER ASSEMBLY." The '277 application claims priority to, and the benefit of, India Patent Application No. 201941041265 filed on Oct. 11, 2019 and entitled "ENERGY HARVESTING ROLLER ASSEMBLY," both of which are incorporated by reference herein in their entirety for all purposes.

FIELD

The present disclosure relates generally to cargo management systems, and more specifically, to an energy harvesting roller.

BACKGROUND

Cargo handling systems, such as those used by aircraft for transport of containerized cargo or pallets, also referred to as unit load devices (ULDs), typically include roller trays containing transport rollers positioned along a cargo bay floor to facilitate movement of the ULDs relative to the bay floor. The power demands of cargo handling systems and aircrafts in general are increasing due to, for example, the use of smart electric systems and an increased number of active sensors, which draw power throughout a flight cycle. Conventional power generation may add more weight to the system which may reduce the systems performance and efficiency.

SUMMARY

An energy harvesting roller for a cargo handling system is disclosed herein. In accordance with various embodiments, the energy harvesting roller may comprise a shaft, a sleeve located on the shaft, a piezoelectric member coupled to the sleeve, and a shell located radially outward of the piezoelectric member and configured to rotate relative to the sleeve. A radially inward surface of the shell may define at least one of a plurality of grooves or a plurality protrusions.

In various embodiments, a wire may be electrically coupled to the piezoelectric member. In various embodiments, the wire may extend through a channel defined by the shaft. In various embodiments, a bearing may be located between the shaft and the shell, and a bushing may be located between the shaft and the bearing.

In various embodiments, the sleeve may comprise an electrically insulating material. In various embodiments, the piezoelectric member may be configured to vibrate in response to the shell rotating about the shaft. In various embodiments, a printed circuit board may be located radially inward of the shell and electrically coupled to the piezoelectric member.

An energy harvesting system for a cargo handling system is also disclosed herein. In accordance with various embodiments, the energy harvesting system may comprise a roller including a piezoelectric member configured to vibrate in response to rotation of the roller, a first energy storage device electrically coupled to the piezoelectric member, a controller in communication with the first energy storage device, and a tangible, non-transitory memory configured to communicate with the controller. The tangible, non-transitory memory may have instructions stored thereon that, in response to execution by the controller, cause the controller to perform operations, which may comprise: determining, by the controller, if a charge of the first energy storage device is greater than or equal to a first threshold charge; and directing, by the controller, power from the first energy storage device to a first application if the charge of the first energy storage device is greater than or equal to the first threshold charge.

In various embodiments, an energy conversion module may be electrically coupled between the piezoelectric member and the first energy storage device.

In various embodiments, the operations may further comprise: determining, by the controller, if the charge of the first energy storage device is greater than or equal to a second threshold charge, the second threshold charge being greater than the first threshold charge; and directing, by the controller, power from the first energy storage device to a second application if the charge of the first energy storage device is greater than or equal to the second threshold charge.

In various embodiments, the operations may further comprise: determining, by the controller, if the charge of the first energy storage device is greater than or equal to a third threshold charge, the third threshold charge being greater than the second threshold charge; and directing, by the controller, power from the first energy storage device to a third application if the charge of the first energy storage device is greater than or equal to the third threshold charge.

In various embodiments, the third application may comprise a second energy storage device. In various embodiments, the roller may further comprise a shaft, a sleeve located on the shaft, and a shell located radially outward of the piezoelectric member and configured to rotate relative to the sleeve. The piezoelectric member may be coupled to the sleeve. A radially inward surface of the shell may define at least one of a plurality of grooves or a plurality protrusions.

In various embodiments, a wire may be electrically coupled to the piezoelectric member. The wire may extend through a channel defined by the shaft. In various embodiments, a printed circuit board may be located radially inward of the shell. The printed circuit board may include the controller.

In various embodiments, the energy harvesting system may further comprise a roller tray. The roller may be located between a first vertical wall and a second vertical wall of the roller tray. A printed circuit board may be coupled to the roller tray. The printed circuit board may include the controller.

A roller tray is also disclosed herein. In accordance with various embodiments, the roller tray may comprise a first vertical wall, a second vertical wall, and a first energy harvesting roller located between the first vertical wall and the second vertical wall. The first energy harvesting roller may comprise a shaft, a sleeve located on the shaft, a piezoelectric member coupled to the sleeve, and a shell located radially outward of the piezoelectric member and configured to rotate relative to the sleeve. A radially inward surface of the shell may define at least one of a plurality of grooves or a plurality protrusions. An energy storage device may be electrically coupled to the first energy harvesting roller.

In various embodiments, a second energy harvesting roller may be electrically coupled to the energy storage device. In various embodiments, a controller may be in communication with the energy storage device, and a tangible, non-transitory memory may be configured to communicate with the controller. The tangible, non-transitory memory may have instructions stored thereon that, in response to execution by the controller, cause the controller to perform operations, which may comprise: determining, by the controller, if a charge of the energy storage device is greater than or equal to a first threshold charge; and directing, by the controller, power from the energy storage device to a first application if the charge of the energy storage device is greater than or equal to the first threshold charge.

In various embodiments, the operations may further comprise: determining, by the controller, if the charge of the energy storage device is greater than or equal to a second threshold charge, the second threshold charge being greater than the first threshold charge; and directing, by the controller, power from the energy storage device to a second application if the charge of the energy storage device is greater than or equal to the second threshold charge.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION OF THE DRAWINGS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical electrical, thermodynamic, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Throughout the present disclosure, like reference numbers denote like elements. Accordingly, elements with like element numbering may be shown in the figures, but may not necessarily be repeated herein for the sake of clarity.

A first component that is "radially outward" of a second component means that the first component is positioned at a greater distance away from a common axis of the first and second components as compared to the second component. A first component that is "radially inward" of a second component means that the first component is positioned closer to a common axis of the first and second components as compared to the second component.

An energy harvesting roller, as disclosed herein, may include piezoelectric material. In accordance with various embodiments, the piezoelectric material is configured to vibrate in response to rotation of the roller shell. In this regard, as cargo is translated over the roller, the shell will rotate and the piezoelectric material will develop vibration energy. In various embodiments, the vibration energy may be converted into electrical energy and stored in a storage device (e.g., a supercapacitor). The energy generated by the roller may be provided to components (e.g., sensors, lights, energy storage devices, etc.) of the cargo handling system and/or of the aircraft. The energy harvesting roller may thus provide a supplementary power source for the cargo handling system and/or for the aircraft.

Figure 1:
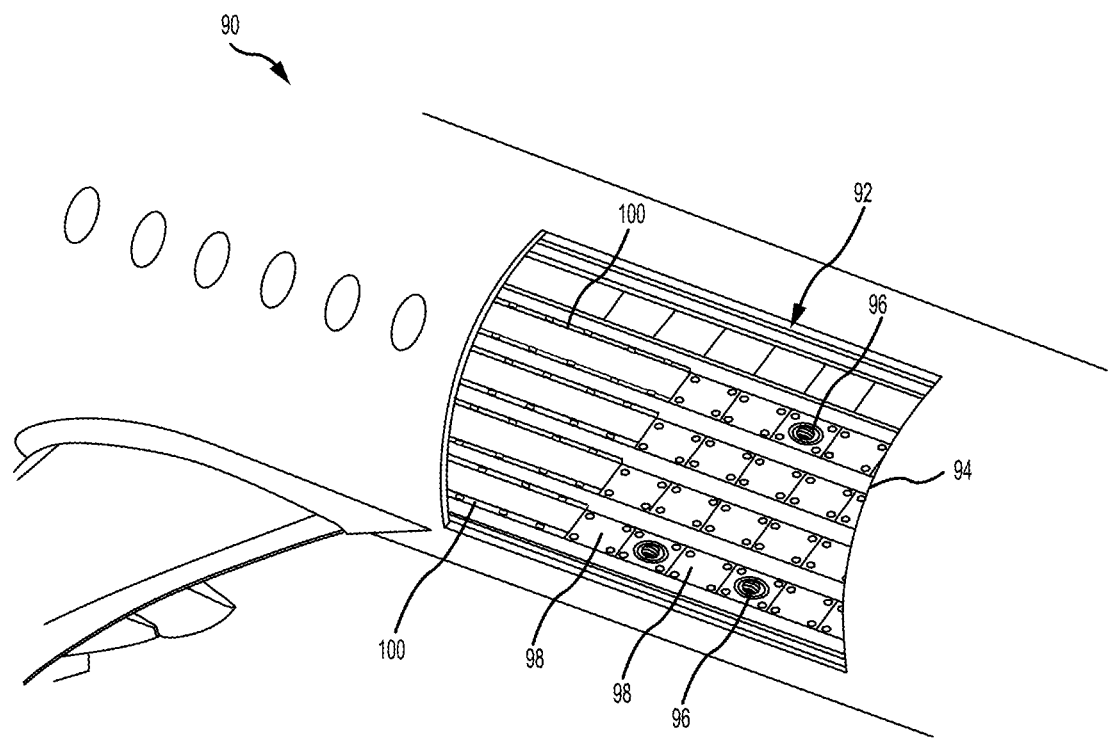
FIG. 1 illustrates an aircraft cargo compartment, in accordance with various embodiments.

With reference to FIG. 1, an aircraft 90 is illustrated having a cargo compartment 92. A cargo door 94 provides access to cargo compartment 92 from outside aircraft 90. In various embodiments, cargo compartment 92 may be equipped with one or more power drive units (PDUs) 96 configured to propel cargo and/or ULDs across cargo compartment 92. Cargo compartment 92 may include one or more ball mats 98 having a plurality of freely rotating conveyance balls. Cargo compartment 92 further includes one or more roller trays 100 extending longitudinally along a length of cargo compartment 92.

Figure 2:
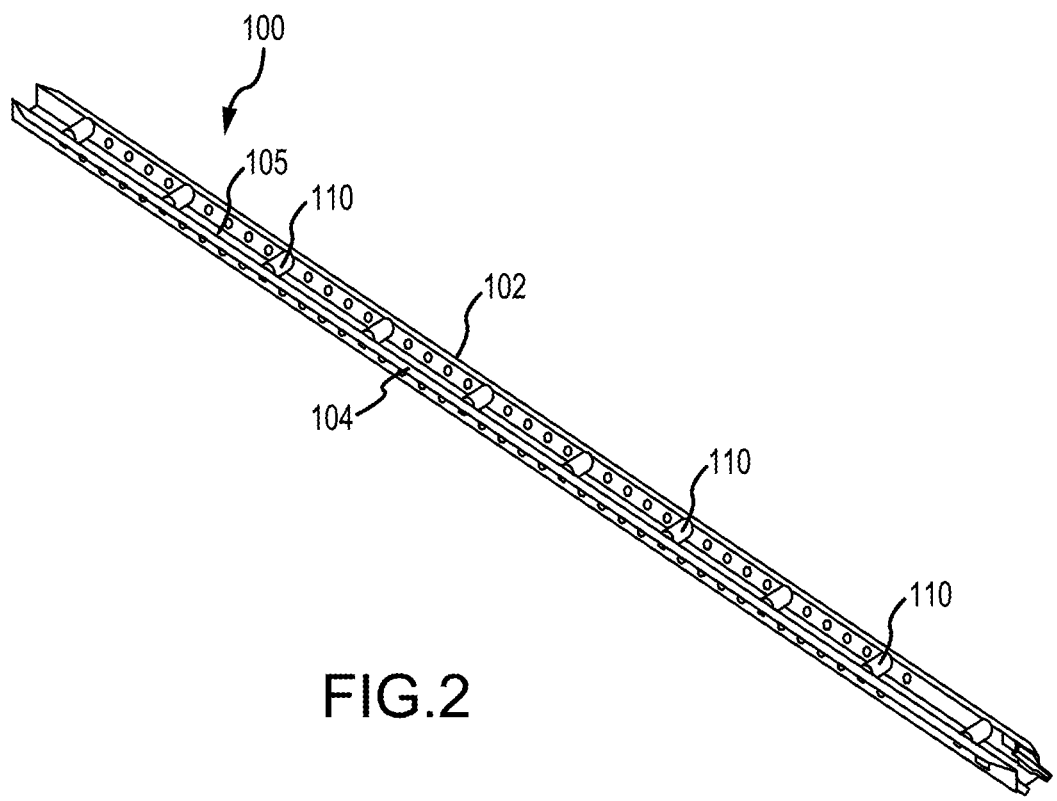
FIG. 2 illustrates a roller tray, in accordance with various embodiments.

With reference to FIG. 2, a roller tray 100 is illustrated. Roller tray 100 includes a pair of vertical walls, including first vertical wall 102 and second vertical wall 104. First and second vertical walls 102, 104 extend from a floor 105 of roller tray. In various embodiments, first and second vertical walls 102, 104 and floor 105 may be part of a single extrusion profile. In accordance with various embodiments, roller tray 100 further includes one or more energy harvesting rollers 110 (referred to herein as rollers 110). Rollers 110 are located between and may be coupled to first vertical wall 102 and second vertical wall 104. Roller 110 are configured to roll or spin in response to cargo and/or ULDs translating over roller tray 100. In this regard, conveyance of cargo over roller tray 100 causes rollers 110 to spin.

Figure 3:
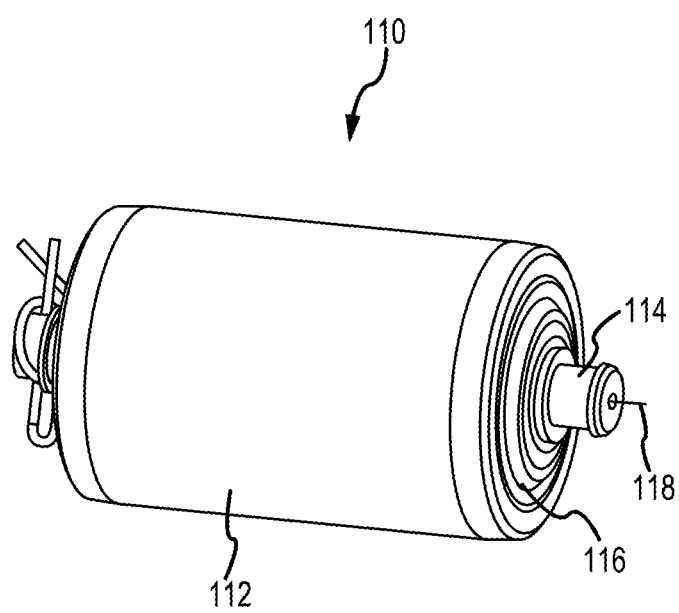
FIG. 3 illustrates an energy harvesting roller, in accordance with various embodiments.

With reference to FIG. 3, a roller 110 is illustrated. In accordance with various embodiments, roller includes a shell 112 and a shaft 114. Shell 112 may rotate relative to shaft 114. Shaft 114 may be coupled to first and second vertical walls 102, 104, with momentary reference to FIG. 2. A pair of bearings 116 may be located between shell 112 and shaft 114. Bearing 116 may facilitate rotation of shell 112 relative to shaft 114. A wire 118 may be located through shaft 114.

Figure 4A:
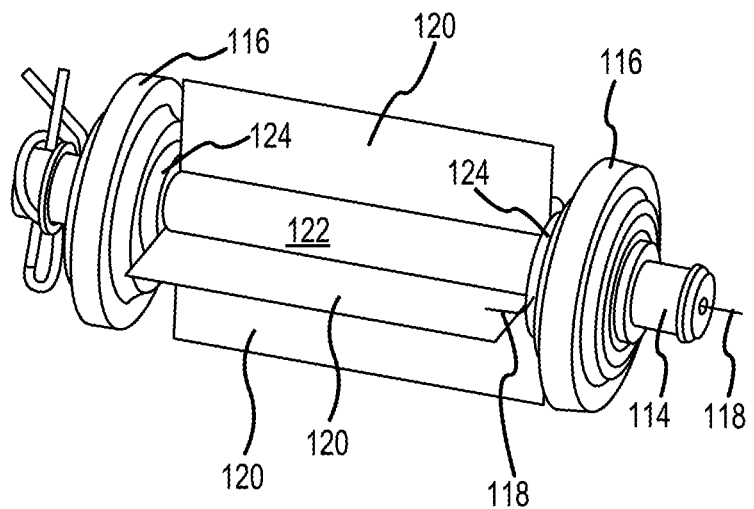
FIGS. 4A and 4B illustrate internal components of an energy harvesting roller, in accordance with various embodiments.
Figure 4B:
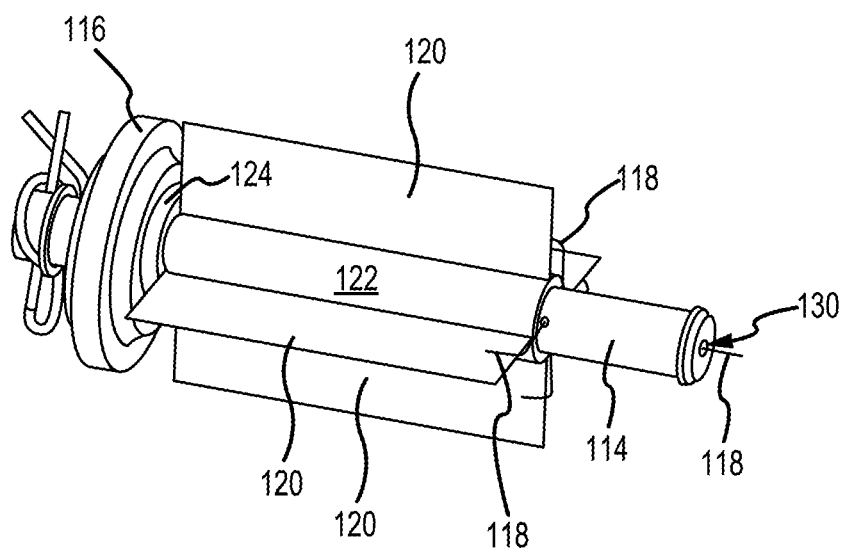

Referring to FIGS. 4A and 4B, roller 110 is illustrated with shell 112 removed to illustrate internal features of roller 110. Roller 110 includes one or more piezoelectric member(s) 120. Piezoelectric members 120 are formed of a piezoelectric material such as lead zirconate titanate, barium titanate, lithium niobate, quartz, or any other suitable piezoelectric material. In various embodiments, piezoelectric members 120 comprise each comprise a piezoelectric bimorph having a passive layer between two active layers of piezoelectric material.

Roller 110 further includes a sleeve 122 and pair of bushings 124. In FIG. 4B one of the bushings 124 and one of the bearings 116 have been removed to illustrate better illustrate wire 118. Sleeve 122 may be located over and around shaft 114. Bushings 124 may be located at the axial ends of sleeve 122 Bushing 124 may be located radially between shaft 114 and bearings 116.

In accordance with various embodiments, wire 118 is in direct contact with each of the piezoelectric members 120. In this regard, wire 118 is electrically coupled to each of the piezoelectric members 120. In various embodiments, wire 118 may be routed through shaft 114. Stated differently, wire 118 may be located in a channel 130 defined by shaft 114.

Figure 5:
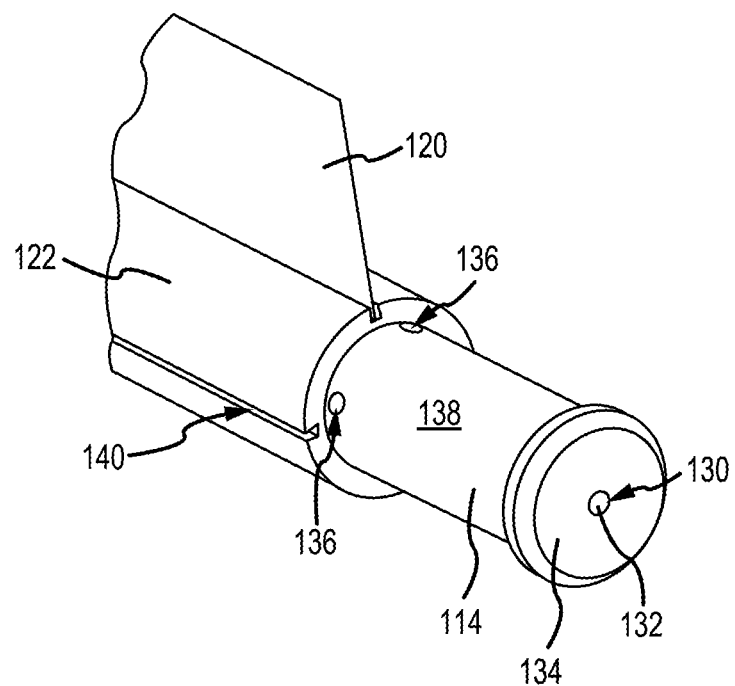
FIG. 5 illustrates piezoelectric material attached to a sleeve of an energy harvesting roller, in accordance with various embodiments.

With reference to FIG. 5, an axial end 134 of shaft 114 is illustrated. In accordance with various embodiments, an inlet 132 of channel 130 may be formed in axial end 134 of shaft 114, and one or more outlet(s) 136 of channel 130 may be formed in the outer circumferential surface 138 of shaft 114. The number of outlets 136 may correspond to (i.e., be equal to) the number of piezoelectric members 120.

In accordance with various embodiments, sleeve 122 defines one or more sleeve grooves 140. Sleeve grooves 140 are configured to receive piezoelectric members 120. The number of sleeve grooves 140 may correspond to (i.e., be equal to) the number of piezoelectric members 120. Sleeve 122 comprises an electrically insulating material. For example, sleeve 122 may be formed of rubber, polyvinyl chloride, polypropylene, or other suitable electrically insulating material.

Figure 6:
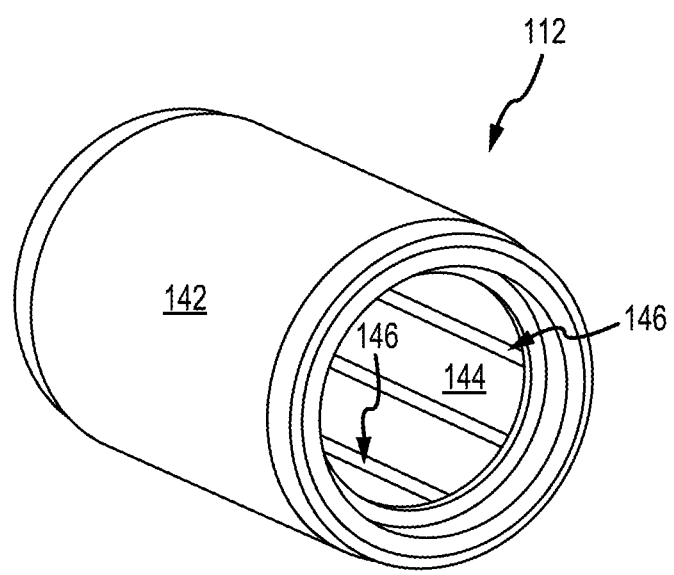
FIG. 6 illustrates a shell for an energy harvesting roller, in accordance with various embodiments.

With reference to FIG. 6, shell 112 is illustrated. In accordance with various embodiments, shell 112 includes a radially outward surface 142 and a radially inward surface 144. Radially inward surface 144 is oriented away from (i.e., opposite) radially outward surface 142 and towards the axis of rotation of roller 110. In various embodiments, shell 112 may comprise a metal or metal alloy. In various embodiments, shell 112 may be aluminum or an aluminum alloy. Radially inward surface 144 defines a plurality of grooves 146. In various embodiments, the number of grooves 146 may be equal to or greater than the number of piezoelectric members 120, with momentary reference to FIG. 4A.

Figure 7A:
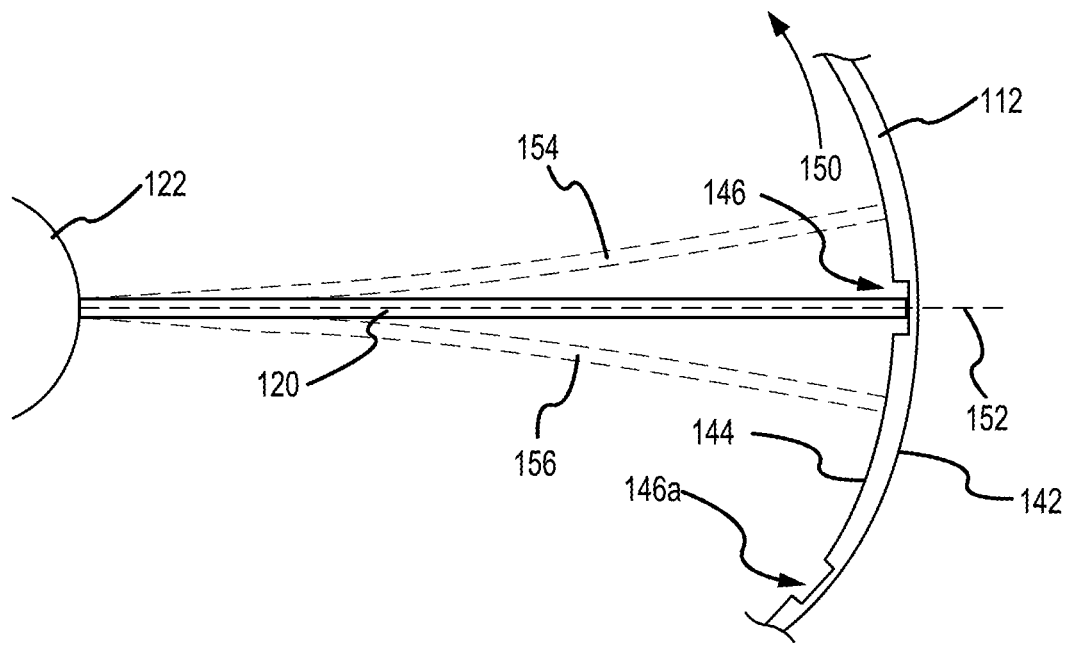
FIGS. 7A and 7B illustrate vibration of a piezoelectric member in response to rotation of the shell of an energy harvesting roller, in accordance with various embodiments.

Referring to FIG. 7A, in accordance with various embodiments, rotation of shell 112 about sleeve 122 is configured to generate vibrational energy in piezoelectric members 120. For example, as shell 112 rotates in direction 150, piezoelectric member 120, which is located in groove 146, deflects from a neutral position 152 to a second position 154. As shell 112 continues to rotate in direction 150, piezoelectric member 120 translates out groove 146. The piezoelectric member 120 may then vibrate freely between second position 154 and a third position 156. Piezoelectric member 120 may continue to vibrate until the next groove 146a is located radially outward of piezoelectric member 120, at which point, groove 146a may receive piezoelectric member 120. Piezoelectric member 120 rotates with groove 146a until piezoelectric member 120 deflects to second position 154, at which point, piezoelectric member 120 translates out groove 146a and vibrates freely until the next groove 146 is located radially outward of piezoelectric member 120. In this regard, as shell 112 rotates, piezoelectric member 120 will be received by the next groove 146 and piezoelectric member 120 will vibrate between second position 154 and third position 156 each time piezoelectric member 120 exits a groove 146. For example, during a cargo loading or unloading, shell 112 rotates in response to a ULD translating over roller 110, thereby causing piezoelectric member 120 to vibrate and generate vibrational energy. As described in further detail below, the vibrational energy generated in piezoelectric member 120 is converted into electrical energy and stored in a storage device, for example, a supercapacitor.

Figure 7B:
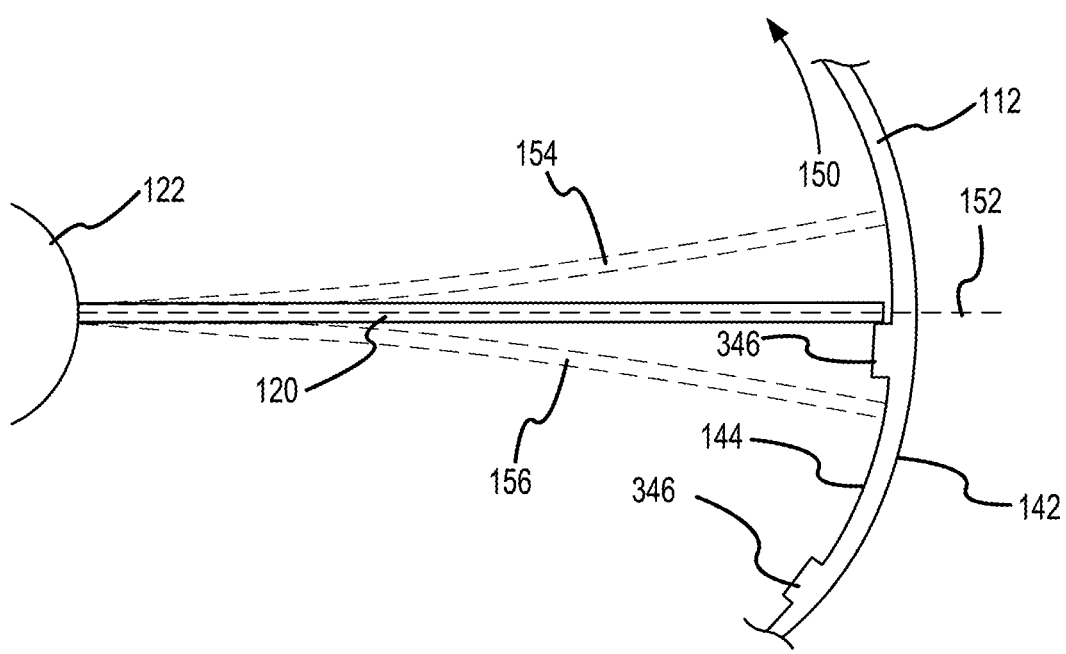

While FIGS. 6 and 7A illustrate radially inward surface 144 of shell 112 defining grooves 146, it is further contemplated and understood that shell 112 may include any structure configured to cause vibration of piezoelectric members 120. For example, and with reference to FIG. 7B, in various embodiments, radially inward surface 144 may define one or more protrusions 346. Protrusions 346 may extend radially inward from radially inward surface 144 of shell 112. Protrusions 346 are configured to cause piezoelectric member 120 to vibrate between second position 154 and third position 156 in response to rotation of shell 112 about shaft 114.

Figure 8A:
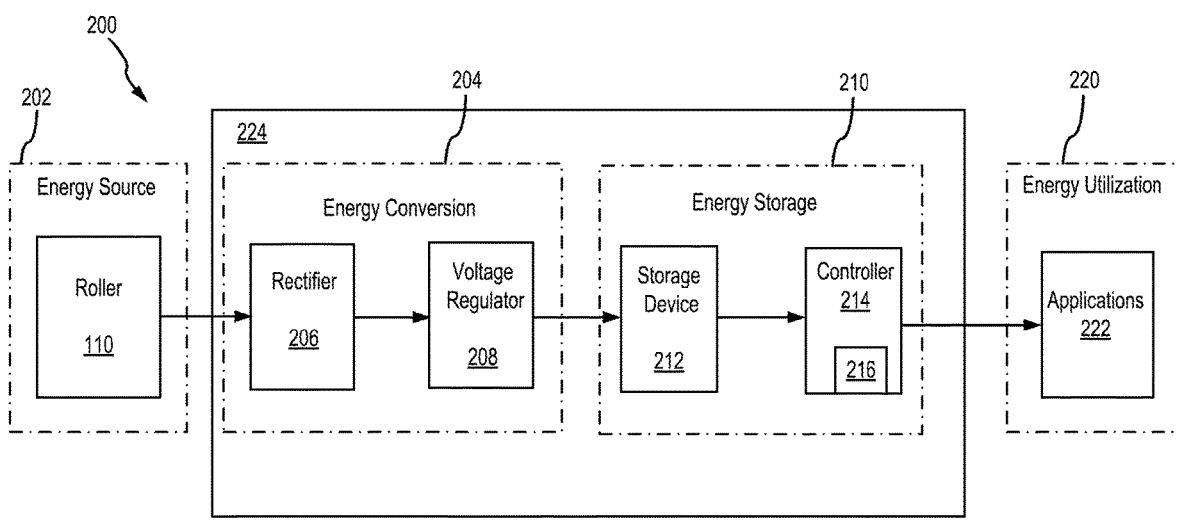
FIGS. 8A and 8B illustrate a schematic diagram of a roller based energy harvesting system, in accordance with various embodiments.

Referring to FIG. 8A, and with continued reference to FIG. 4B, an energy harvesting system 200 is illustrated. In accordance with various embodiments, energy harvesting system 200 includes an energy source 202. Energy source 202 comprises one or more rollers 110 including piezoelectric members 120. Energy harvesting system 200 further includes an energy conversion module 204. Energy conversion module 204 converts the vibration energy from piezoelectric member 120 to electrical energy. Energy conversion module 204 may include a rectifier 206 and a voltage regulator 208. Rectifier 206 comprises an alternating current (AC) to direct current (DC) converter, for example, an AC to DC bridge rectifier. Rectifier 206 is electrically coupled to piezoelectric members 120 (e.g., via wire 118). Rectifier 206 may convert the energy (e.g., AC) received from piezoelectric members 120 to DC. Voltage regulator 208 may be electrically coupled to an output of rectifier 206.

Energy harvesting system 200 further includes an energy storage module 210. Energy storage module 210 is configured to temporarily store the electrical energy generated by energy source 202. Energy storage module 210 may comprise a storage device 212. Storage device 212 comprises a rechargeable battery. In various embodiments, storage device 212 comprises a supercapacitor (e.g., an electrostatic double layer capacitor, hybrid capacitor, etc.). Storage device 212 is configured to store the energy generated by energy source 202 and output from energy conversion module 204. Energy storage module 210 further includes a controller 214 electrically coupled to an output of storage device 212. Controller 214 may be configured to control the storage and disbursement of energy generated by rollers 110.

Controller 214 may comprise a processor and a tangible, non-transitory memory 216. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuuten to fall outside the scope of patentable subject matter under 35 U.S.C. § 101.

Controller 214 may comprise one or more logic modules that implement energy harvesting and disbursement logic. An energy utilization phase 220 of energy harvesting system 200 includes one or more applications 222 electrically coupled to controller 214. Controller 214 is configured to output energy (e.g., voltage) stored in storage device 212 to applications 222.

Figure 9:
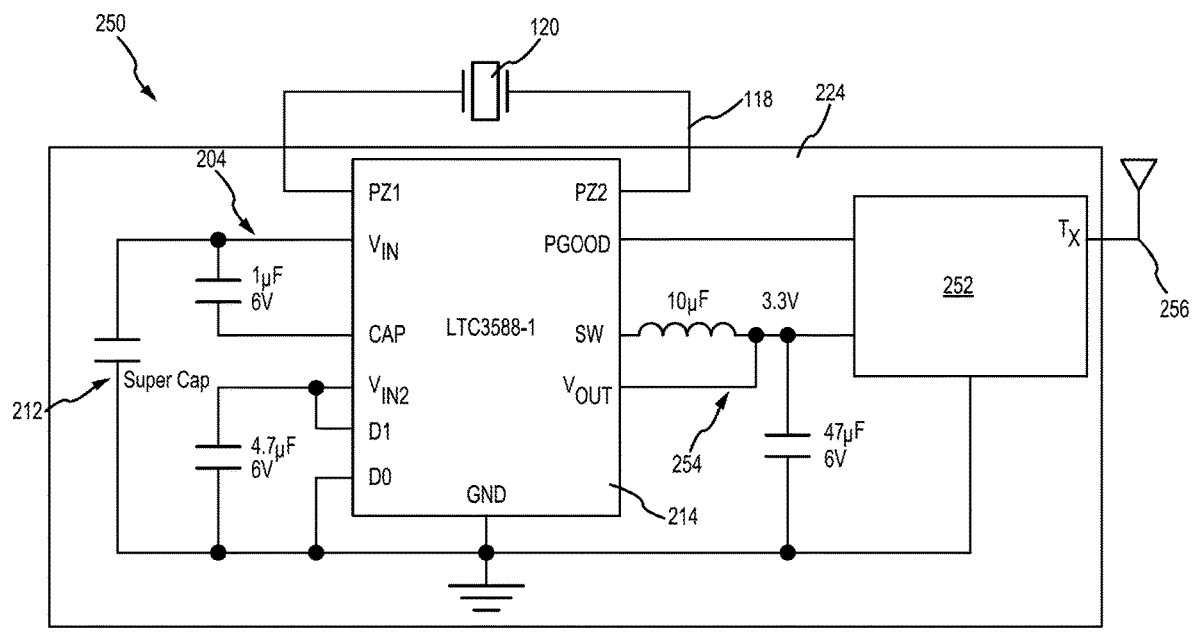
FIG. 9 illustrates a schematic diagram of a piezoelectric material based energy harvesting circuit, in accordance with various embodiments.

In various embodiments, one or more over voltage protection, over current protection, and/or reverse voltage protection circuits may be located between controller 214 and applications 222. In various embodiments, energy conversion module 204 and energy storage module 210 and/or circuitry for applications 222 may be located on a printed circuit board (PCB) 224. PCB 224 may be located within in roller 110. For example, PCB 224 may be located radially inward of shell 112. In various embodiments, PCB 224 may be located on or within roller tray 100, with momentary reference to FIG. 2. In various embodiments, PCB 224 may be mounted to first vertical wall 102. Mounting PCB 224 to roller tray 100 may allow multiple to rollers 110 to be connect to a single PCB 224 and/or to a single storage device 212. With reference to FIG. 9, an exemplary circuit 250, which may be included on PCB 224, is illustrated, in accordance with various embodiments. Piezoelectric members 120 are electrically coupled to an input of circuit 250. Circuit 250 may include storage device 212 and circuitry for energy conversion module 204. Circuit 250 may further include application circuitry 252. In various embodiments, application circuitry 252 may include wireless sensor circuits coupled to a wireless transmitter 256. In this regard, energy harvesting system 200 may be employed to power wireless communication for an autonomous cargo handling system. In various embodiments, the output of application circuitry 252 may be a wired connection. In various embodiments, one or more over voltage protection, over current protection, and/or reverse voltage protection circuits 254 may be located between controller 214 and application circuitry 252. In various embodiments, application circuitry 252 may not be located on PCB 224. For example, an output of circuit 250 and PCB 224 may be electrically coupled to an input of application circuitry located off PCB 224.

Figure 8B:
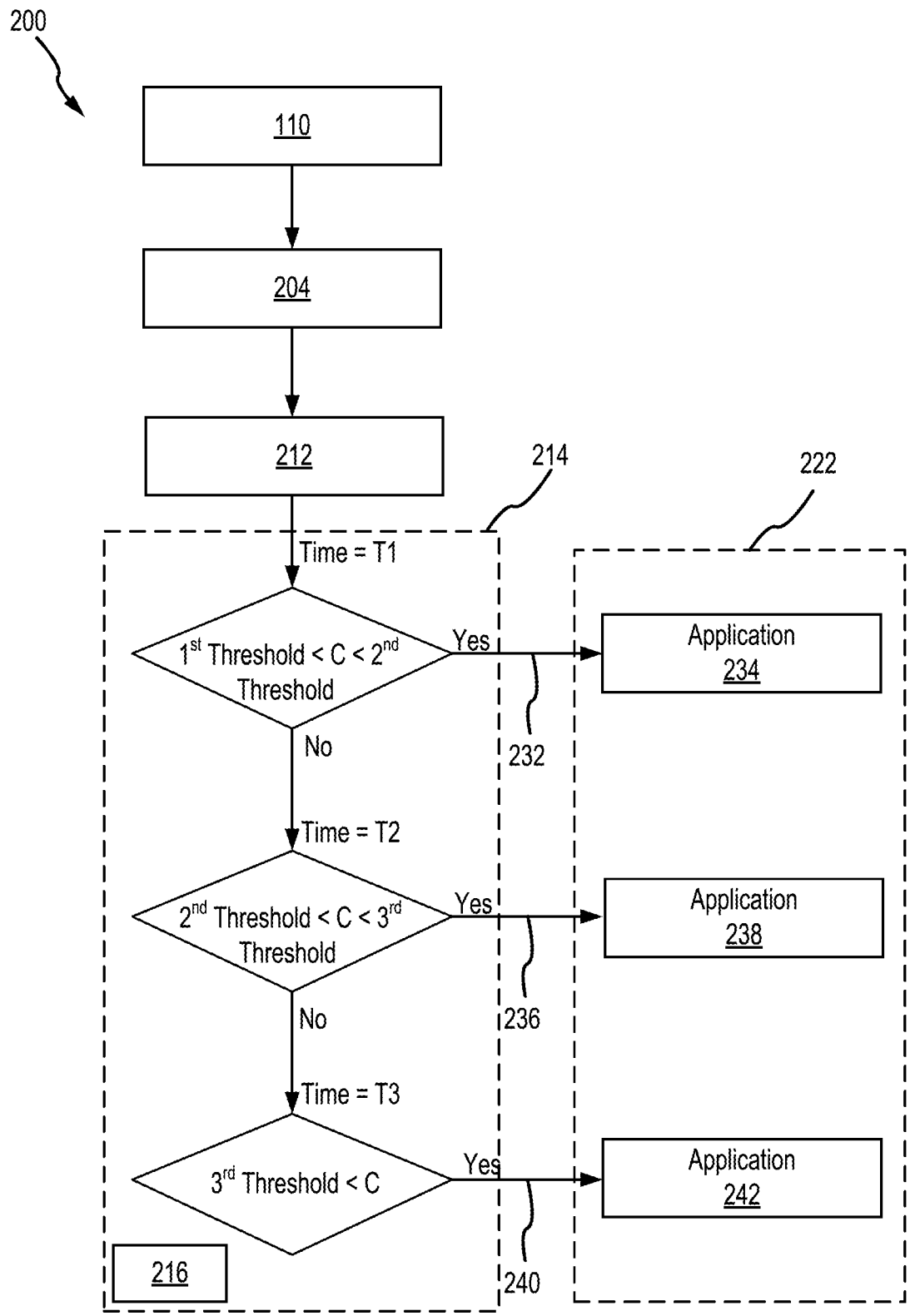

With reference to FIG. 8B, exemplary energy distribution logic, which may be applied by controller 214, is illustrated, in accordance with various embodiments. In accordance with various embodiments, controller 214 determines where to distribute energy (e.g., output voltage) based on energy (e.g., charge) within storage device 212. At time T1, controller 214 determines the charge C of storage device 212. If controller 214 determines charge C is greater than or equal to a first threshold charge, controller 214 directs power 232 from storage device 212 to a first application 234. In various embodiments, first application 234 may be a health monitoring circuit and sensors. At time T1 controller 214 may also determine if charge C is greater than a second threshold charge. The second threshold charge may be the sum of the voltage associated with powering first application 234 and the voltage associated with powering a second application 238. If controller 214 determines charge C is greater than or equal to the second threshold charge, controller 214 directs power 236 from storage device 212 to second application 238 and power 232 to first application 234. If controller 214 determines charge C is less than the second threshold charge, controller 214 only directs power 232 to first application 234 and sets the next time controller 214 will determine the charge of storage device 212 to time T2.

The power generated by roller 110 may be greater than the power supplied to first application 234 and the charge of storage device 212 may increase. Controller 214 may be configured to determine at time T2 if the charge C of storage device 212 is greater than or equal to the second threshold charge and less than a third threshold charge. If controller 214 determines charge C is greater than or equal to the second threshold charge and less than the third threshold charge, controller 214 directs power 236 from storage device 212 to second application 238. In various embodiments, second application 238 may be illumination of lights in the cargo deck.

As roller 110 continues to spin, the power generated by piezoelectric members 120 may be greater than the power supplied to first and second applications 234, 238 and the charge of storage device 212 may increase. Controller 214 may be configured to determine at time T3 if the charge C of storage device 212 is greater than or equal to the third threshold charge. If controller 214 determines charge C is greater than or equal to the third threshold charge, controller 214 directs power 240 from storage device 212 to a third application 242. The third threshold charge may be the sum of the voltage associated with powering first application 234, second application 238, and third application 242. In various embodiments, third application 242 is a power storage device (e.g., a supplementary power source). In this regard, energy generated by roller 110 may be provided to other cargo handling and/or aircraft power sources. In accordance with various embodiments, the priority of first application 234, second application 238, and third application 242 can be interchangeable. For example, controller 214 may be configured to provide power to third application 242 prior to first application 234 and/or second application 238.

Energy harvesting system 200 may provide supplementary power for the cargo handling system. Energy harvesting system 200 may be employed to power various cargo handling and/or aircraft sensors, such as proximity sensors, smoke sensor, automatic latch sensors, water ingress sensors, etc. Energy harvesting system 200 may be employed to power visual indicators and lights of the cargo handling system. Excess power generated by energy harvesting system 200 may be stored and/or used to replenish other aircraft power source. Energy harvesting system 200 tends to reduce the amount power consumed from other the aircraft power sources, which may allow the size and capacity of the other aircraft power sources to be reduced.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An energy harvesting system for a cargo handling system, the energy harvesting system comprising:
a roller including a piezoelectric member configured to vibrate in response to rotation of the roller; a first energy storage device electrically coupled to the piezoelectric member; a controller in communication with the first energy storage device; and
a tangible, non-transitory memory configured to communicate with the controller, the tangible, non-transitory memory having instructions stored thereon that, in response to execution by the controller, cause the controller to perform operations comprising:
determining, by the controller, if a charge of the first energy storage device is greater than or equal to a first threshold charge; and directing, by the controller, power from the first energy storage device to a first application if the charge of the first energy storage device is greater than or equal to the first threshold charge;
further comprising an energy conversion module electrically coupled between the piezoelectric member and the first energy storage device;
wherein the operations further comprise: determining, by the controller, if the charge of the first energy storage device is greater than or equal to a second threshold charge, the second threshold charge being greater than the first threshold charge; and
directing, by the controller, power from the first energy storage device to a second application if the charge of the first energy storage device is greater than or equal to the second threshold charge.

2. The energy harvesting system of claim 1, wherein the operations further comprise:
determining, by the controller, if the charge of the first energy storage device is greater than or equal to a third threshold charge, the third threshold charge being greater than the second threshold charge; and directing, by the controller, power from the first energy storage device to a third application if the charge of the first energy storage device is greater than or equal to the third threshold charge.

3. The energy harvesting system of claim 2, wherein the third application comprises a second energy storage device.

4. The energy harvesting system of claim 2, wherein the roller further comprises: a shaft; a sleeve located on the shaft, the piezoelectric member being coupled to the sleeve; and a shell located radially outward of the piezoelectric member and configured to rotate relative to the sleeve, wherein a radially inward surface of the shell defines at least one of a plurality of grooves or a plurality of protrusions.

5. The energy harvesting system of claim 4, further comprising a wire electrically coupled to the piezoelectric member, wherein the wire extends through a channel defined by the shaft.

6. The energy harvesting system of claim 4, further comprising a printed circuit board located radially inward of the shell, the printed circuit board including the controller.

7. The energy harvesting system of claim 4, further comprising: a roller tray, wherein the roller is located between a first vertical wall and a second vertical wall of the roller tray; and a printed circuit board coupled to the roller tray, the printed circuit board including the controller.

8. A roller tray, comprising: a first vertical wall; a second vertical wall; a first energy harvesting roller located between the first vertical wall and the second vertical wall, the first energy harvesting roller comprising:
a shaft; a sleeve located on the shaft; a piezoelectric member coupled to the sleeve; and a shell located radially outward of the piezoelectric member and configured to rotate relative to the sleeve, wherein a radially inward surface of the shell defines at least one of a plurality of grooves or a plurality of protrusions; an energy storage device electrically coupled to the first energy harvesting roller a controller in communication with the energy storage device; and a tangible, non-transitory memory configured to communicate with the controller, the tangible, non-transitory memory having instructions stored thereon that, in response to execution by the controller, cause the controller to perform operations comprising:

determining, by the controller, if a charge of the energy storage device is greater than or equal to a first threshold charge; and directing, by the controller, power from the energy storage device to a first application if the charge of the energy storage device is greater than or equal to the first threshold charge;

wherein the operations further comprise: determining, by the controller, if the charge of the energy storage device is greater than or equal to a second threshold charge, the second threshold charge being greater than the first threshold charge; and directing, by the controller, power from the energy storage device to a second application if the charge of the energy storage device is greater than or equal to the second threshold charge.

9. The roller tray of claim 8, further comprising a second energy harvesting roller electrically coupled to the energy storage device.

* * * * *